United States Patent Office 3,799,828
Patented Mar. 26, 1974

3,799,828
SYNTHETIC PAPERS AND THE METHOD OF MAKING THE SAME
Masanori Takashi and Mitsuo Yoshiyasu, Yokkaichi, Japan, assignors to Mitsubishi Petrochemical Company Limited, Tokyo-to, Japan
Original application Mar. 21, 1969, Ser. No. 809,629, now abandoned. Divided and this application Aug. 12, 1971, Ser. No. 171,103
Claims priority, application Japan, Mar. 26, 1968, 43/19,204
Int. Cl. B32b 31/14
U.S. Cl. 156—229          4 Claims

ABSTRACT OF THE DISCLOSURE

A synthetic paper of a laminated structure consists of a base layer made of a biaxially oriented plastic film containing 0–20% by weight of a fine inorganic filler and at least one paper-like layer made of a uniaxially oriented plastic film containing 0.5–65% by weight of a fine inorganic filler. This synthetic paper is made by laminating the paper-like layer in non-oriented state on the base layer which has been previously subjected to uniaxial drawing in its longitudinal direction to obtain a composite laminated structure, and further drawing the composite structure thus obtained in its transverse direction.

---

This application is a divisional application of Ser. No. 809,629, filed Mar. 27, 1969, now abandoned.

BACKGROUND OF THE INVENTION

This invention relates to a synthetic paper made of laminated plastic film structure which can be employed similarly as conventional papers, including all papers within the category of papers, for the same purpose and in the same manner.

In the present day, papers are one of the most typical materials being consumed enormously for type-writing and printing uses and as wrapping and decorative material, and these papers generally consist of various thinly and evenly intertwined fibres especially vegetable fibres and/or synthetic fibres.

Heretofore, it has been also proposed to employ plastic films having paper-like appearance and the same functions as conventional papers in place of the papers having structure as mentioned above. The future development of so-called "synthetic paper" as mentioned above is expected because of the particular or unique characteristic features of plastic films.

Fundamental papermaking techniques for plastic materials are as summarized hereinbelow.

(1) A process for applying chemical or physical treatments such as making a porous surface, transferring a paper surface, embossing, sand-blasting, and oxidation on a surface of a non-drawn or drawn plastic film itself to obtain a paper-like surface thereon.

(2) A process for providing a paper-like layer on the surface of an non-oriented or oriented plastic film by a surface coating of an inorganic powder.

(3) A process for making a paper-like plastic film by forming a plastics mixed with a filler into a film.

These processes, however, have some respective disadvantages. For example, the most typical or fundamental functional requirement for papers for typewriting or printing use is not necessarily satisfied by the synthetic papers obtained by Process (1). In this respect, Process (2) is better than Process (1), but a fast adhering of a paper-like layer as mentioned above to base material of a plastic film is not necessarily easily attained. Furthermore, it is difficult to make a thin paper-like layer over a certain limiting thickness of the layer. Accordingly, in Process (2), making of thin synthetic papers is comparatively difficult.

Process (3) is interesting on the point that, in principle, synthetic papers are obtained by merely applying a film forming process on plastic materials, and, further, synthetic papers thus obtained have generally favorable typewritability and printability. However, Process (3) has also the following disadvantages. One is that, although the essential feature of Process (3) relates to a process of merely forming a plastics mixed with a filler into a film, a non-oriented film mixed with a filler is insufficient in its strength or toughness, and, in addition, it is generally difficult to obtain a film having a sufficiently thin thickness in Process (3). Although these disadvantages can be eliminated by drawing the resulting film, drawing of the plastic film mixed with filler is limited to uniaxial drawing because of its inferiority in biaxial drawing property, and, accordingly, these disadvantages are not sufficiently overcome. Another disadvantage relating to Process (3) resides in the directional properties of a synthetic paper to be made because the paper is merely subjected substantially to uniaxial drawing.

SUMMARY OF THE INVENTION

It is an object of the presnt invention to eliminate disadvantages as mentioned above in conventional synthetic papers and to provide synthetic papers having excellent properties.

The foregoing object and other objects have been achieved by the provision of a synthetic paper of a laminated structure consisting of a biaxially oriented plastic film and at least one uniaxially oriented plastic film mixed with a filler and by a method of making the synthetic paper.

A chracteristic feature of the synthetic paper according to this invention is that the synthetic paper is a laminated structure consisting of a film of a first thermoplastic resin inorganic filler content of which is 0–20% by weight and at least one film of a second thermoplastic resin mixed with a fine inorganic filler (content of the inorganic filler being within a range of 0.5–65% by weight) which is caused to adhere to at least one surface of the first thermoplastic film, the first thermoplastic film being in a biaxially oriented state, and the second thermoplastic film mixed with filler being in a uniaxially oriented state. The second or outer film loaded with filler and drawn usually has many micro-voids at least on the surface thereof, so that the synthetic paper comprising the film is made more paper-like. The first or base film, in the preferable embodiment, also has micro-voids.

Furthermore, a characteristic feature of the method of making the synthetic paper is that the thermoplastic resin mixed with fine inorganic filler (content of the inorganic filler being within a range of 0.5–65% weight) is laminated on at least one surface of the uniaxially oriented film of the thermoplastic resin the film of which has been previously drawn and oriented, by at least 1.3 times in its longitudinal direction to obtain a composite laminated structure, the composite structure being further subjected to drawing under heat at least 2.5 times in its transverse direction and cooled while the oriented state thereof is substantially maintained. The drawing of the film loaded with filler generates, in general, many micro-voids in the film.

DETAILED DESCRIPTION

Figure 1:
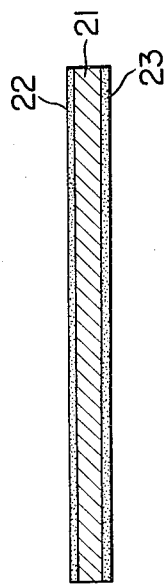
FIG. 1 is an enlarged sectional view showing an example of the synthetic paper according to this invention.
Figure 2:
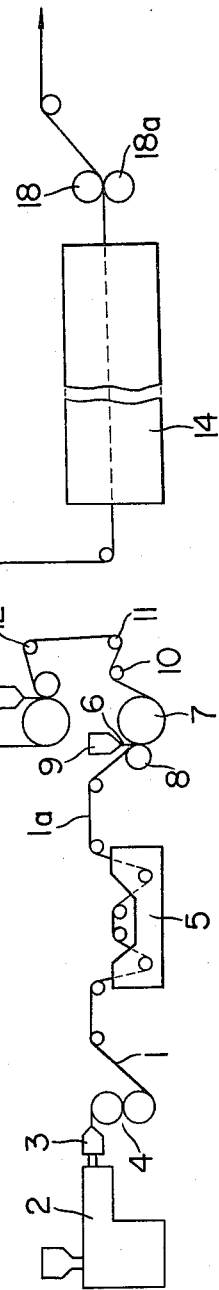
FIG. 2 is a diagrammatic side elevation showing an example of the apparatus according to the invention for making synthetic papers.

According to the present invention, the synthetic paper of this invention essentially consists of a base layer and a paper-like layer, that is, the synthetic paper is produced by the combination of the base layer which has been biaxially oriented and has sufficient strength (tensile strength or toughness) and the uniaxially oriented paper-like layer mixed with filler being of insufficient strength but excellent in its typewritability, printability, gloss, feeling, etc. The above-mentioned various disadvantages can be eliminated by this synthetic paper.

In this invention, means for adhesion and drawing of the two layers are simpler than those for the process of surface coating with inorganic powder from the viewpoint of production process, and the adhesive strength of the two layers caused to adhere by the above-mentioned means is generally remarkably high. Furthermore, in this case, it is possible to make the thickness of the two layers very thin, for instance, even in a three-layered structure of the synthetic paper formed by causing each paper-like layer to adhere on both surfaces of the base layer, the total thickness of the synthetic paper thus obtained can be held to that of a common paper and below approximately 30 microns. The thickness of each of the two layers is controlled in its comparatively thick state prior to drawing of the layer in which state control thereof can be easily carried out. Then, since the thickness of the layer is controlled in accordance with the drawing ratio, a final precise thickness of each layer can be controlled with sufficient accuracy, and, in this respect, this process has a more favorable production stability than that of the process of surface coating with inorganic powder.

The synthetic papers according to this invention as described above can be applied for various and suitable uses of conventional papers as high grade printing papers, papers for cards, maps, and charts, decoration papers, dull finished or mat papers, typewriting papers, duplicating papers, drafting papers, tracing papers, writing papers, drawing papers, packaging papers, wrapping papers, paper boards, and the like.

As the base layer for the synthetic paper according to the present invention by which the advantages mentioned above can be expected, a suitable thermoplastic resin of orientable property can be used. Specifically, polyolefin resins such as homopolymers and copolymers of, for example, ethylene, propylene, and butene-1; polyamide resins; polyester resin such as polyethylene terephthalate; polyvinyl resins such as homopolymers and copolymers of vinyl chloride; and polyvinylidene resins such as homopolymers and copolymers of vinylidene chloride, and homopolymers and copolymers of styrene can be used single or as a mixture therewith. Further, auxiliary materials such as stabilizer, plasticizer, filler, and pigment may be contained in the base material resin within its drawable range as necessary. In this case, when less than 20% by weight of a filler is blended into the base material resin, some favorable results can be obtained. That is, whiteness or opacity, stiffness, and toughness of the resulting synthetic paper can be improved, and since the surface of the base layer becomes coarse, adhesion of the base layer with the paper-like layers becomes more tenacious.

An orientable thermoplastic resin used for the paper-like layer may be the same or a different resin selected from the group consisting of the above-mentioned resins for the base layer. In the case in which the softening point of the paper-like layer resin is less than that of the base layer resin (for instance, in the case in which the base layer is made of a homopolymer, and the paper-like layer is made of a copolymer containing a monomer which is a component unit of the above homopolymer, most of the resulting paper-like layers have lower softening points than those of the respective base layers) a favorable heat sealing can be carried out free from shrinkage of the base layer. In this case, for the resin of paper-like layer, a resin having a sufficient adhesiveness with respect to the above-mentioned base layer for lamination should be selected. The resin for paper-like layer may also contain a suitable auxiliary material similarly as in the case of the base layer resin.

The paper-like layer resin contains a fine inorganic filler, but a filler which is caused to lose its function or is subject to discoloration by the decomposition of the filler at a temperature which may be applied in the course of making the synthetic paper is undesirable for this invention. Examples of suitable inorganic fillers for the paper-like layer are clay, talc, asbestos, gypsum, barium sulfate, calcium carbonate, magnesium carbonate, titanium oxide, zinc oxide, magnesium oxide, diatomaceous earth, and silicon oxide used singly or as a mixture of two or more thereof. In this case, it is necessary that the filler should be sufficiently fine (for example, of a grain size approximately 0.5–30 microns). The paper-like layer contains 0.5–65%, preferably 5–60%, by weight, of the fine filler.

As a result of the addition of the inorganic filler, whiteness, stiffness, and toughness of the paper-like layer are improved. Furthermore, by using a fine inorganic filler which generates voids in the paper-like layer when the layer mixed with the fine inorganic filler is subjected to uniaxial drawing in the process of making the synthetic paper, the printability, whiteness and feeling of the paper-like layer thereof can be further intensified because of the generation of voids. If required, the above-mentioned fine inorganic filler may be employed in admixed state with a pigment or organic fillers such as vegetable fibres.

In the present invention, first of all, the resin for the base layer mentioned above is formed into a film by a process such as calendering or extrusion molding, whereby the formed film is subjected to uniaxial drawing, and the resin for the paper-like layer mixed with fine inorganic filler is laminated on at least one surface of the film by calendering or melt extrusion laminating. In this case, the film of base layer is drawn by at least 1.3 times in the longitudinal direction thereof, and the calendering or melt extrusion laminating is carried out in accordance with a known method. It is also possible to apply an anchor coat which is adopted in such a melt extrusion lamination as mentioned above on the base film.

Next, the resulting composite structure, that is, the lamination layer consisting of the uniaxially oriented base film and the substantially non-oriented paper-like film is subjected to hot drawing by at least 2.5 times in the transverse direction of the lamination layer in accordance with a conventional method. This drawing assures a firm adhesion of the paper-like layer with the base layer, and, simultaneously, the thicknesses of both layers can be made very thin. After the drawing, the synthetic paper according to this invention is obtained by cooling the two layers and fixing the oriented state thereof while substantially maintaining this state.

The surface features of the synthetic paper thus obtained, if necessary, can be modified by a suitable surface treatment.

Referring to the accompanying drawing, FIG. 1 is an enlarged sectional view showing as example of the synthetic paper according to this invention, in which the paper-like layers 22 and 23 mixed with filler are laminated on both surfaces of the base layer 21, wherein the layers 22 and 23 are in the state of uniaxial orientation, and the base layer 21 is in the state of biaxial orientation. In this case, the two paper-like layers 22 and 23 are of the same or different composition, and the thicknesses of the layers may be the same or different.

The method according to the present invention will now be more fully described in connection with the accompanying drawing.

A drawable thermoplastic resin for the base layer is heated to and kneaded at an extrudable temperature in an extruder 2 and extruded through a slit of a die 3. The resin for base layer thus extruded is then cooled to a required temperature by a cooling device 4 thereby to produce a non-oriented film 1. In this case, for the cooling device 4, suitable means such as roll cooling or water bath cooling means, or combinations thereof may be employed. Furthermore, instead of extrusion, well-known calendering and like processes may be adopted.

The non-oriented film 1 is drawn by at least 1.3 times in a longitudinal direction drawing machine 5 to obtain a film 1a uniaxially oriented in the longitudinal direction, which film 1a is then transferred to a succeeding laminating process. The uniaxially oriented film 1a is passed through a gap between metal roll 7 (cooling water can pass there through, and the surface of the roll is finished to a mirror surface) and a nip roll 8 provided with a rubber lining.

Separately a thermoplastic resin for the paper-like layer containing a fine inorganic filler and pigment is heated and blended in an extruder (not shown), and the resin so blended is extruded through a die 9 to obtain a molten sheet 6, which is laminated with the aforesaid uniaxially oriented film thereby to complete a first surface laminating process.

Then, the sheets (composite) thus laminated are transferred to a second surface laminating process through guide rollers 10, 11, and 12, and surface lamination is carried out by a similar operation as in the first surface laminating process.

The laminations on both surfaces of the base layer may be separately carried out regardless of their order, and the lamination is not necessarily applied on both surfaces of the base layer but may be applied on either surface thereof. Furthermore, in the case of laminations on both surfaces of the base layer, the same composition is not required for both surfaces.

The composite sheet thus obtained is drawn transversely by at least 2.5 times in a suitable transverse direction drawing machine, for example, a tentering machine 14, the composite sheet thus drawn is cooled while its drawn state is substantially maintained to produce a synthetic paper. The resulting synthetic paper is taken out by nip rolls 18 and 18a, listings of the synthetic paper being trimmed, and the synthetic paper thus trimmed is wound into a roll.

In order to indicate still more fully the nature and utility of the invention, the following examples of preferred embodiment thereof are set forth, it being understood that these examples are presented as illustrative only and that they are not intended to limit the scope of the invention.

Example 1

Polypropylene of an M.I. (Melt Index) =0.8 was heated and kneaded in an extruder the temperature of which was set at 270° C., and the polypropylene thus kneaded was extruded through a die. The product thus extruded was cooled by a cooling device to a temperature of 40° C. or less to obtain a non-oriented film. The non-oriented film was drawn and oriented by 5.5 times in a longitudinal-direction drawing machine.

A compound obtained by admixing 15% by weight of talc and 15% by weight of titanium white with polypropylene of M.I.=4.0 was extruded and laminated on one surface of the film uniaxially oriented in its longitudinal direction. Next, then the laminated film was further heated and drawn transversely by 7.5 times, to obtain a biaxially oriented film which was cooled, while its oriented state was being maintained, listings thereof being cut out thereby to produce a synthetic paper, which was wound into a roll.

The synthetic paper thus obtained was a laminated structure consisting of a base layer having a thickness of 30 microns and a paper-like layer having a thickness of 20 microns. The adhesive strengths of the two layers were remarkably high so that they could not be peeled apart. The synthetic paper of this laminated structure could be used for the same purposes as a conventional paper on the points of, for example, strength, feeling, printability, and writability.

Example 2

Polystyrene for extrusion molding was heated and kneaded in an extruder the temperature of which was set at 200° C., and the polystyrene thus kneaded was extruded through a die to produce a film, which was cooled by a cooling device to a temperature of 15° C. and then drawn by 2.5 times in a longitudinal-direction-drawing-machine thereby to produce a film uniaxially oriented in the longitudinal direction.

On one hand, a mixture obtained by uniformly admixing 100 parts of polyvinyl chloride, 40 parts of a plasticizer, 25 parts of clay, 10 parts of titanium white, and 5 parts of a stabilizer (all the parts being by weight) was extruded and laminated on both surfaces of the abovementioned uniaxially oriented film. Then the laminted film was further subjected to orientation under heat transversely by 2.5 times to produce a biaxially oriented film, which was cooled, while its oriented state was being maintained, listings thereof being cut out, thereby to produce a synthetic paper, which was wound into a roll.

The synthetic paper thus obtained was a laminated structure consisting of a middle base layer having a thickness of 25 microns and surface paper-like layers each having a thickness of 10 microns, the total thickness of the laminated structure being 45 microns. The synthetic paper having this laminated structure could be employed for the same purposes as a conventional paper on the points of, for example, strength, toughness, feeling, and printability.

Example 3

A compound consisting of 100 parts of polypropylene having a M.I. of 1.0, 15 parts of a polystyrene for extrusion molding, and 5 parts of heavy calcium carbonate was mixed by a mixing roll, and the mixed compound was subjected to sheeting to produce a sheet, from which pellets were prepared.

The pellets were heated and kneaded in an extruder the temperature of which was set at 260° C., and the compound thus blended was extruded through a die and cooled by a cooling device to a temperature of approximately 20° C. to produce an original sheet. The sheet was drawn by 4 times in a longitudinal-direction-drawing-machine to obtain a film uniaxially oriented in the longitudinal direction.

Separately, a mixture obtained by admixing 60 parts of diatomaceous earth with 100 parts of polypropylene having a M.I. of 10 was extruded by the use of a vent type extruder and laminated on both surfaces of the above-mentioned uniaxially oriented film to obtain a three-layered original film. This film was then heated and transversely drawn by 7 times to obtain a biaxially oriented film, which was cooled while its oriented state was maintained, listings thereof being cut out, thereby to produce a synthetic paper, which was wound into a roll.

The synthetic paper thus obtained was a three-layered laminated structure consisting of a base layer having a thickness of 30 microns, each of the paper-like layers having a thickness of 20 microns, and the adhesive strengths of the three layers were remarkably high, so that they could not be easily peeled apart.

The synthetic paper of this laminated structure, in which each paper-like layer was uniaxially drawn and the surface and interior thereof had many small vacant spaces had a structure similar to that of conventional paper. As a result, the synthetic paper according to this invention has excellent paper properties such as printability, writability, whiteness, gloss, toughness, etc. Furthermore, gloss adjustment and the like treatment could be easily applied on the synthetic paper of this laminated structure by a super calender similarly as in the case of conventional paper.

We claim:
1. A method of making synthetic paper which comprises:
   (a) laminating a thermoplastic resin overlay film admixed with from about 20 to 65% by weight of a fine inorganic filler upon at least one surface of a uniaxially oriented base film of a thermoplastic resin drawn at a temperature below its melting point to at least 2.5 times its initial dimension in a longitudinal direction to form a composite laminate structure,
   (b) drawing said composite laminate structure while heating the same to a length of at least 2.5 times its initial dimension in a transverse direction to the initial orientation to obtain a laminated structure consisting of one biaxially oriented base film and at least one uniaxially oriented overlay film and
   (c) cooling said laminated structure while maintaining the film members of the laminate in their respective oriented states.
2. A method according to claim 1 wherein the laminating step
   (a) comprises laminating by melt extruding the said thermoplastic resin overlay film on the base film.
3. A method of making synthetic paper according to claim 1 which comprises:
   (a) laminating a polypropylene overlay film admixed with from about 20 to 65% by weight of a fine inorganic filler upon both surfaces of a uniaxially oriented base film of polypropylene admixed with up to about 20% by weight of a fine inorganic filler and drawn at a temperature below its melting point to at least 2.5 times it initial dimension in a longitudinal direction to form a composite laminate structure,
   (b) drawing said composite laminate structure while heating to a length of at least 2.5 times its initial dimension in a transverse direction to the initial orientation to obtain a laminated structure consisting of a biaxially oriented film and a uniaxially oriented film and
   (c) cooling said laminate structure while maintaining the film members of the laminate in their respective oriented states.
4. A method according to claim 3 wherein the laminating step
   (a) comprises laminating by melt extruding the said polypropylene overlay film on the base film.

References Cited
UNITED STATES PATENTS

| | | | |
|---|---|---|---|
| 3,671,383 | 6/1972 | Sakata et al. | 161—402 |
| 3,627,625 | 12/1971 | Jarrett | 161—402 X |
| 2,594,229 | 4/1952 | Snyder et al. | 156—229 X |

EDWARD G. WHITBY, Primary Examiner

U.S. Cl. X.R.

161—166, 402